(12) United States Patent
Aktas

(10) Patent No.: US 10,836,281 B2
(45) Date of Patent: Nov. 17, 2020

(54) INERTIAL LATCH FOR A SEATBACK OF A VEHICLE SEAT

(71) Applicant: Ford Global Technologies, LLC, Dearborn, MI (US)

(72) Inventor: Macit Aktas, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 9 days.

(21) Appl. No.: 16/268,754

(22) Filed: Feb. 6, 2019

(65) Prior Publication Data

US 2020/0247282 A1    Aug. 6, 2020

(51) Int. Cl.
   *B60N 2/30*    (2006.01)
   *B60N 2/00*    (2006.01)
   *B60N 2/22*    (2006.01)
   *B60N 2/20*    (2006.01)

(52) U.S. Cl.
   CPC .......... *B60N 2/2227* (2013.01); *B60N 2/206* (2013.01)

(58) Field of Classification Search
   CPC ........ B60N 2/20; B60N 2/366; B60N 2/3011; B60N 2/305; B60N 2/3013; B60N 2/856
   See application file for complete search history.

(56) References Cited

U.S. PATENT DOCUMENTS

| 4,118,067 | A | 10/1978 | Tanaka |
| 4,909,571 | A | 3/1990 | Vidwans et al. |
| 7,748,778 | B1 | 7/2010 | Udriste et al. |
| 7,775,594 | B2 * | 8/2010 | Bruck ...................... B60N 2/20 297/362 |
| 7,780,234 | B2 | 8/2010 | Grable et al. |
| 8,342,605 | B2 | 1/2013 | Tanaka et al. |
| 2010/0026073 | A1 * | 2/2010 | Bruck .................. B60N 2/0232 297/378.1 |
| 2016/0016486 | A1 * | 1/2016 | Aktas ...................... B60N 2/12 297/378.12 |

FOREIGN PATENT DOCUMENTS

| CN | 105799565 | 7/2016 |
| DE | 20200801044 | 1/2009 |

* cited by examiner

*Primary Examiner* — Shin H Kim
(74) *Attorney, Agent, or Firm* — David Coppiellie; Price Heneveld LLP

(57) ABSTRACT

A vehicle seat assembly includes a seatback rotationally coupled to a base at a first pivot. A securing pin is coupled with the seatback. An inertial latch is operable about a second pivot to define an idle position defined by the inertial latch biased distal from the securing pin. A deployed position is defined by an opposing directional force biasing the inertial latch into selective engagement with the securing pin wherein the seatback is maintained in a predetermined rotational position.

17 Claims, 9 Drawing Sheets

INERTIAL LATCH FOR A SEATBACK OF A VEHICLE SEAT

FIELD OF THE INVENTION

The present invention generally relates to vehicle seating, and more specifically, an inertial latch that activates during a rapid deceleration to prevent forward rotation of the seatback.

BACKGROUND OF THE INVENTION

Seating positions within vehicles typically include seatbacks that are rotationally operable between various positions to recline the seatback or to fold the seatback down to add cargo space within the vehicle.

SUMMARY OF THE INVENTION

According to one aspect of the present invention, a vehicle seat assembly includes a seatback rotationally coupled to a base at a first pivot. A securing pin is coupled with the seatback. An inertial latch is operable about a second pivot to define an idle position defined by the inertial latch biased distal from the securing pin. A deployed position is defined by an opposing directional force biasing the inertial latch into selective engagement with the securing pin wherein the seatback is maintained in a predetermined rotational position.

Embodiments of this aspect of the invention can include any one or combination of the following features:
  the inertial latch in the deployed position engages a top portion of the securing pin and prevent forward rotation of the seatback
  the inertial latch in the idle position defines an offset between the inertial latch and the securing pin, wherein the securing pin is rotationally operable with the seatback and within the offset between a plurality of rotational positions
  the inertial latch is selectively operable to define the deployed position through at least a range of use positions of the plurality of rotational positions
  the inertial latch is a single piece hook that rotationally operates about the second pivot
  the inertial latch is biased toward the idle position by a biasing mechanism that operates about the second pivot
  the securing pin is rearward of the first pivot, and wherein rotational operation of the seatback from an upright position to a storage position defines an initial upward rotation of the securing pin relative to the inertial latch
  the inertial latch in the deployed position is free of engagement with a front portion and a bottom portion of the securing pin According to another aspect of the present invention, a vehicle seat includes a base having a first pivot and a second pivot. A seatback is rotationally operable about the first pivot between a plurality of rotational positions. A securing pin attached to the seatback. An inertial latch is operable about the second pivot between idle and deployed positions. The inertial latch in the idle position defines an offset within which the securing pin can operate through the plurality of rotational positions. The deployed position is defined by an opposing directional force biasing the inertial latch into selective engagement with a top portion of the securing pin and holding the seatback in a selected position of the plurality of rotational positions.

Embodiments of this aspect of the invention can include any one or combination of the following features:
  the base defines a bumper section that prevents rotational operation of the vehicle seat rearward of the plurality of rotational positions
  the offset is defined by a gap between the inertial latch and the securing pin in the idle position, wherein the securing pin is rotationally operable with the seatback and within the offset between the plurality of rotational positions
  the inertial latch is selectively operable to define the deployed position through at least a range of positions of the plurality of rotational positions
  the inertial latch is a single piece hook that rotationally operates about the second pivot
  the inertial latch is biased toward the idle position by a biasing spring that operates about the second pivot
  the securing pin is rearward of the first pivot, and wherein rotational operation of the seatback from an upright position to a folded position defines an initial upward movement of the securing pin relative to the inertial latch
  the inertial latch in the deployed position is free of engagement with a front portion and a bottom portion of the securing pin
  upon removal of the opposing directional force the inertial latch is biased back toward the idle position According to another aspect of the present invention, a method for operating a seatback for a seat assembly of a vehicle includes biasing an inertial latch using a return biasing force toward an idle position to define an offset. The seatback is positioned in a selected position of a plurality of rotational positions that locates a securing pin within the offset. A opposing directional force is applied that opposes and overcomes the return biasing force. The inertial latch is rotated to a deployed position to engage a top portion of the securing pin to prevent generally upward rotation of the securing pin relative to the inertial latch.

Embodiments of this aspect of the invention can include any one or combination of the following features:
  removing the opposing directional force, wherein the inertial latch is biased by the return biasing force toward the idle position such that the seatback is selectively operable between the plurality of rotational positions
  preventing forward rotation of the seatback away from the selected position when the inertial latch is in the deployed position These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
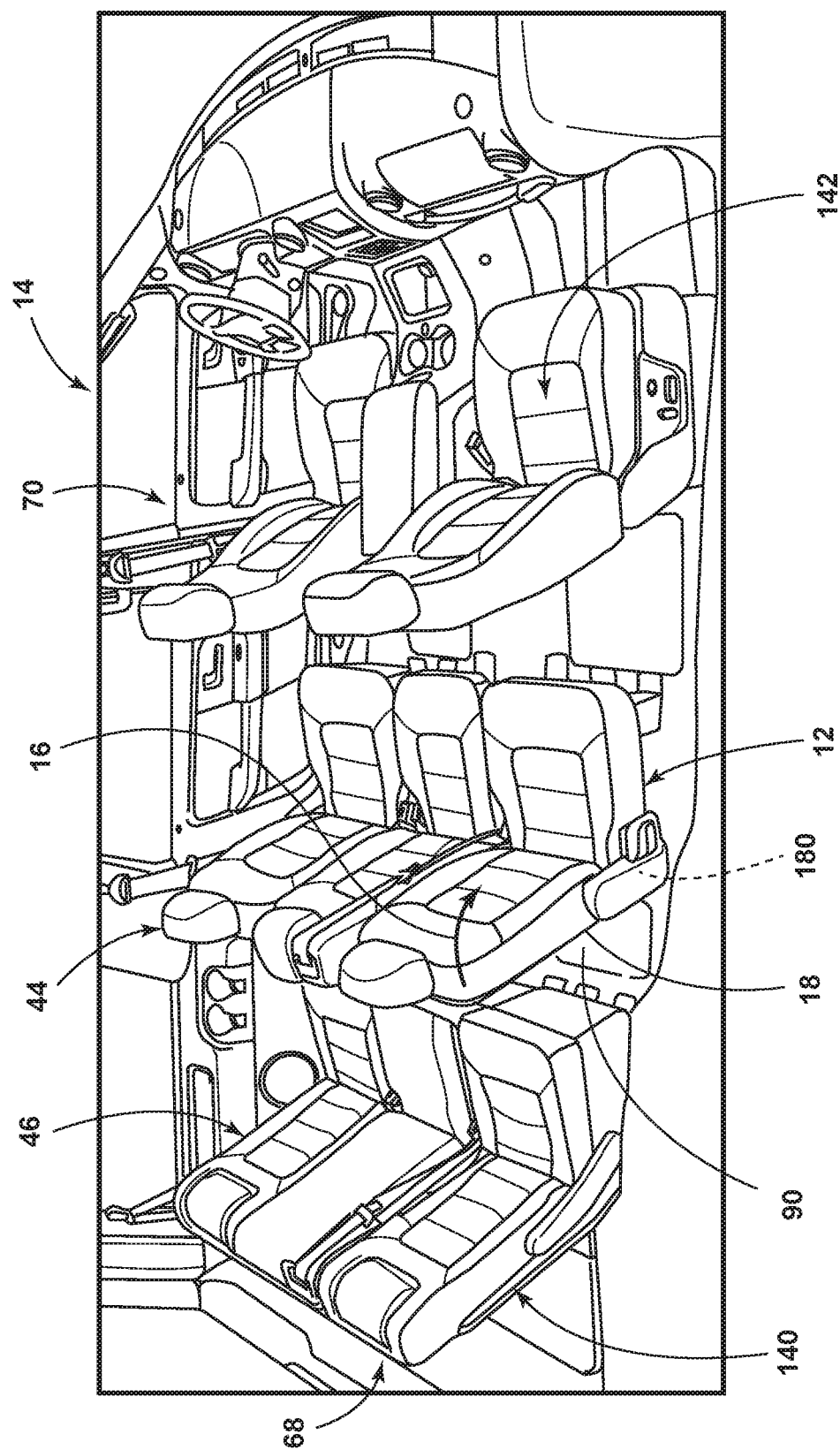
FIG. 1 is a perspective view of a passenger cabin of a vehicle that incorporates seatbacks that utilize an aspect of the inertial latch.
Figure 2:
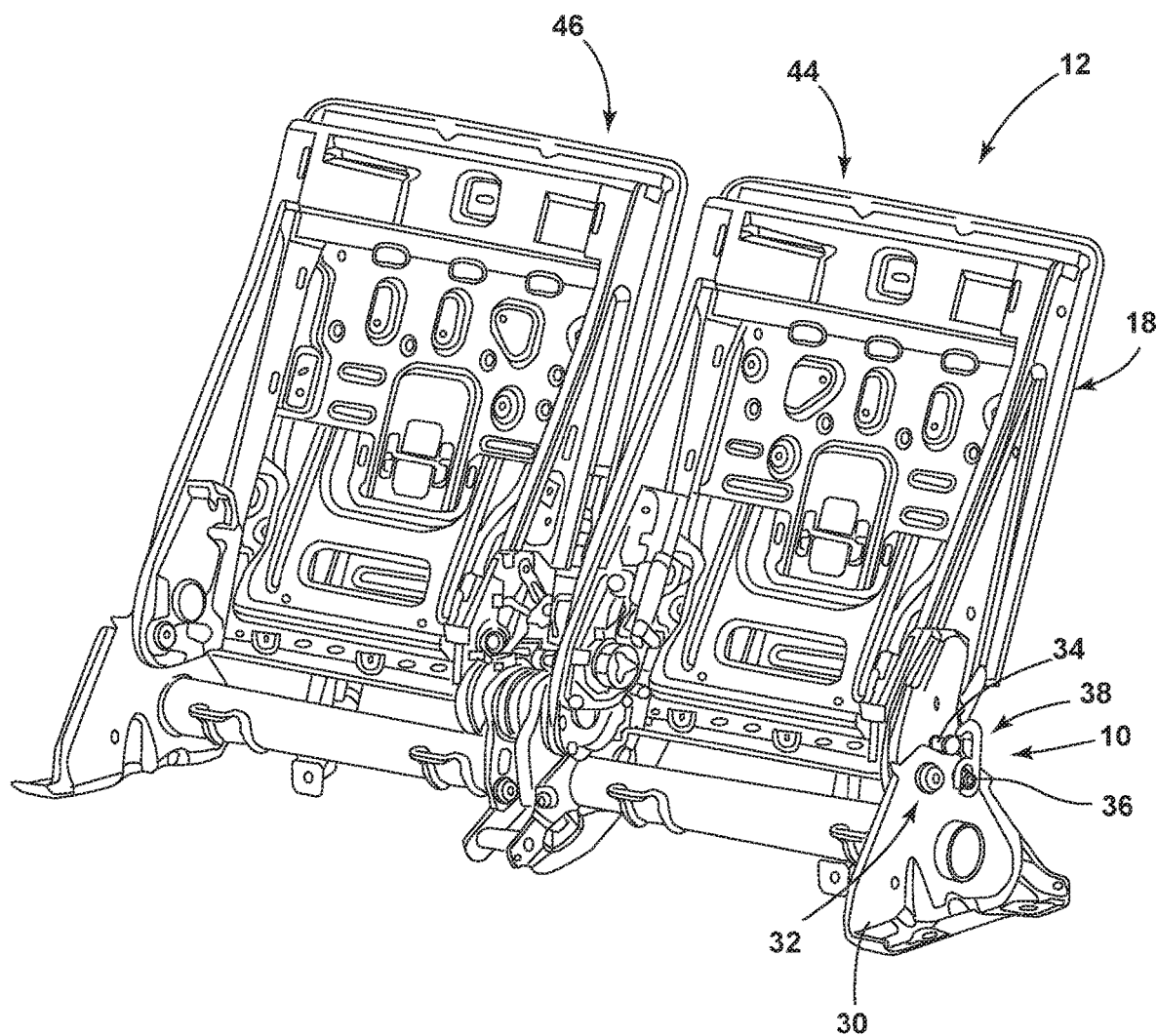
FIG. 2 is a perspective view of the interior structure of adjacent seatbacks for a rear seating position within a vehicle.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-7, reference numeral 10 generally refers to an inertial latch that is coupled with a seat assembly 12 for a vehicle 14. The inertial latch 10 is used to prevent forward rotation 16 of the seatback 18 during a sudden and typically extreme deceleration event 20, such as a sudden stop or an impact or collision involving the vehicle 14. The inertial latch 10 is also adapted to prevent objects, such as cargo 22, that may be positioned behind the vehicle 14 from pushing the seatback 18 forward during the deceleration event 20.

According to various aspects of the device, as exemplified in FIGS. 1-7, the seat assembly 12 for the vehicle 14 can include the seatback 18 that is rotationally coupled to a base 30 at a first pivot 32. A securing pin 34 is coupled with the seatback 18. The inertial latch 10 is operable about a second pivot 36 to define an idle position 38 of the inertial latch 10. The idle position 38 is defined by the inertial latch 10 being biased distal from the securing pin 34. A deployed position 40 of the inertial latch 10 is defined by an opposing directional force 42 that biases the inertial latch 10 into selective engagement with the securing pin 34. The engagement of the inertial latch 10 in the deployed position 40 with the securing pin 34 serves to maintain the seatback 18 in a predetermined rotational position 44, such as an upright position 46. In the deployed position 40, the inertial latch 10 typically engages a top portion 48 of the securing pin 34 to prevent forward rotation 16 of the securing pin 34 and the seatback 18, thereby maintaining the seatback 18 in the predetermined rotational position 44.

Referring again to FIGS. 2-7, the seatback 18 for the seat assembly 12 can be operable between a plurality of rotational positions 60. These rotational positions 60 can include an upright position 46, where the seatback 18 is positioned for use by an occupant. The seatback 18 can be rotated forward to a storage position 62, where the rear surface 64 of the seatback 18 typically defines a horizontal portion 66 of the storage compartment 68 for the vehicle 14. In various aspects of the device, the seatback 18 is also operable between a plurality of use positions 70, where the seatback 18 can be reclined or inclined at the election of the occupant of the seat assembly 12.

Figure 3:
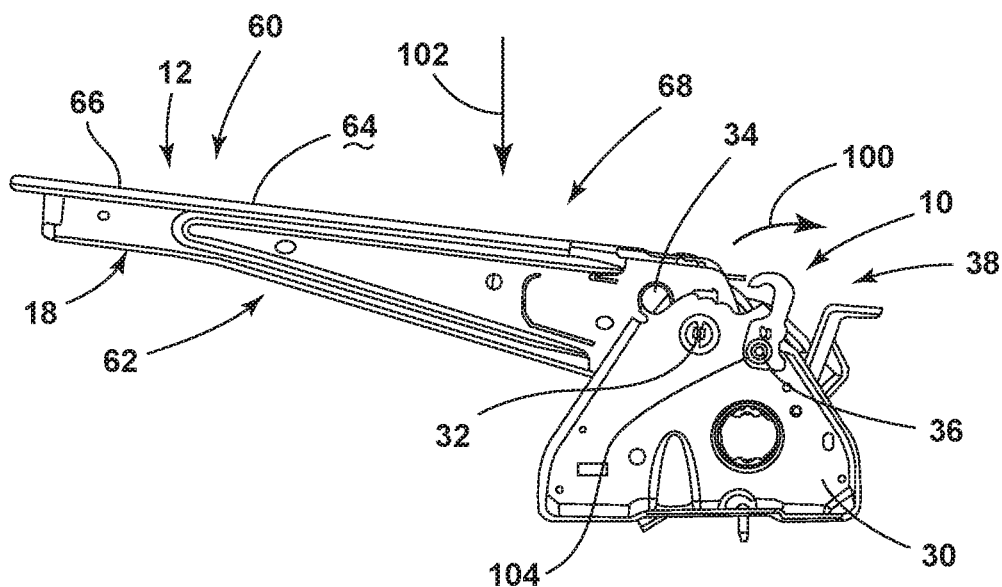
FIG. 3 is a side elevational view of the seatback of FIG. 2 shown in a folded down storage position.
Figure 4:
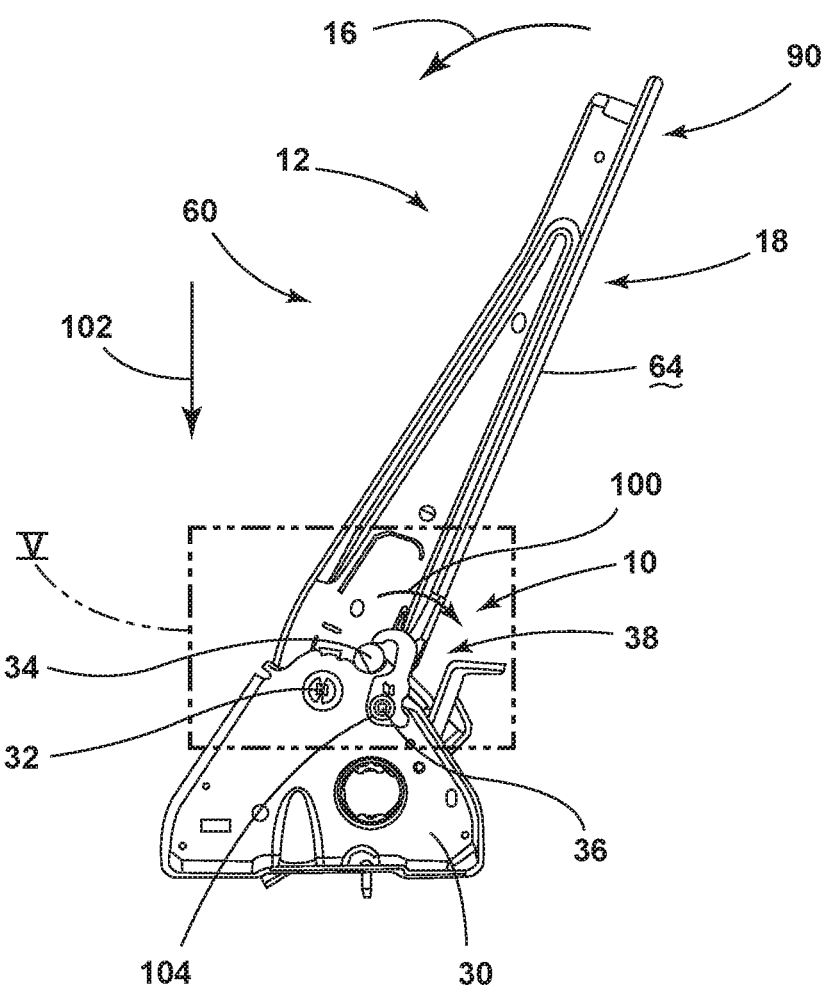
FIG. 4 is a side elevational view of the seatback of FIG. 2 shown in an upright position.

As exemplified in FIGS. 3 and 4, when the seatback 18 is in the storage position 62, the securing pin 34 for the seatback 18 is moved forward and away from the inertial latch 10. When the inertial latch 10 is in the idle position 38, the securing pin 34 and seatback 18 are freely operable between the plurality of rotational positions 60. When the seatback 18 is in the upright position 46 or one of the plurality of use positions 70, the securing pin 34 is forward of the inertial latch 10 to define an offset 80 between the inertial latch 10 and the securing pin 34. This offset 80 provides for a clearance space 82 that allows the securing pin 34 to move about the first pivot 32 between the plurality of rotational positions 60.

In certain aspects of the device, it is contemplated that this offset 80 can allow for some rotational movement of the seatback 18 between the plurality of use positions 70. In this manner, the offset 80 defined between the inertial latch 10 and the securing pin 34 can provide an occupant of the seat assembly 12 with the ability to incline and recline the seatback 18 as desired by the user. In each of these use positions 70, it is contemplated that the inertial latch 10 can be moved into the deployed position 40 to retain the seatback 18 in a predetermined rotational position 44 that is indicative of a selected position 90 or a current position of the seatback 18 within the plurality of rotational positions 60.

As discussed above, it is also contemplated that the seatback 18 may be operable only between the upright and the storage positions 62. In such an embodiment, the seatback 18 may not be operable between a plurality of use positions 70 and only a single upright position 46 may be defined by the seatback 18 for the seat assembly 12.

Referring again to FIGS. 5-7, the inertial latch 10 for the seat assembly 12 is rotationally operable about the second pivot 36. The second pivot 36 is coupled with the base 30 and is offset 80 from the first pivot 32 about which the securing pin 34 and seatback 18 rotate. The inertial latch 10 is biased towards the idle position 38. In this manner, the inertial latch 10 can be biased to the idle position 38 by a return biasing force 100. This return biasing force 100 can be exerted upon the inertial latch 10 by force of gravity 102, where the inertial latch 10 is weighted so that the center of gravity 102 of the inertial latch 10 is below the second pivot 36. The return biasing force 100 can also be exerted by a biasing mechanism 104. This biasing mechanism 104 can be in the form of a spring that extends between the base 30 and the inertial latch 10. This spring can be an inertial spring such as a coil spring, or other similar spring member. This spring is calibrated such that the inertial latch 10 is maintained in the idle position 38. During an impact event or other sudden, and typically extreme, deceleration event 20, the opposing directional force 42 is exerted against the entire vehicle 14, including the inertial latch 10. The opposing directional force 42 is typically in a forward direction 170 and in opposition to the inertial spring. In this manner, the opposing directional force 42 overcomes the return biasing force 100 and causes the inertial spring to move forward from the idle position 38 to the deployed position 40. As discussed above, in the deployed position 40, the inertial latch 10 rotates over the securing pin 34 and engages a top portion 48 of the securing pin 34. This positioning of the inertial latch 10 prevents rotation of the securing pin 34 about the first pivot 32. This engagement, in turn, prevents the seatback 18 from rotating about the first pivot 32 and holds the seatback 18 in the upright position 46.

Figure 5:
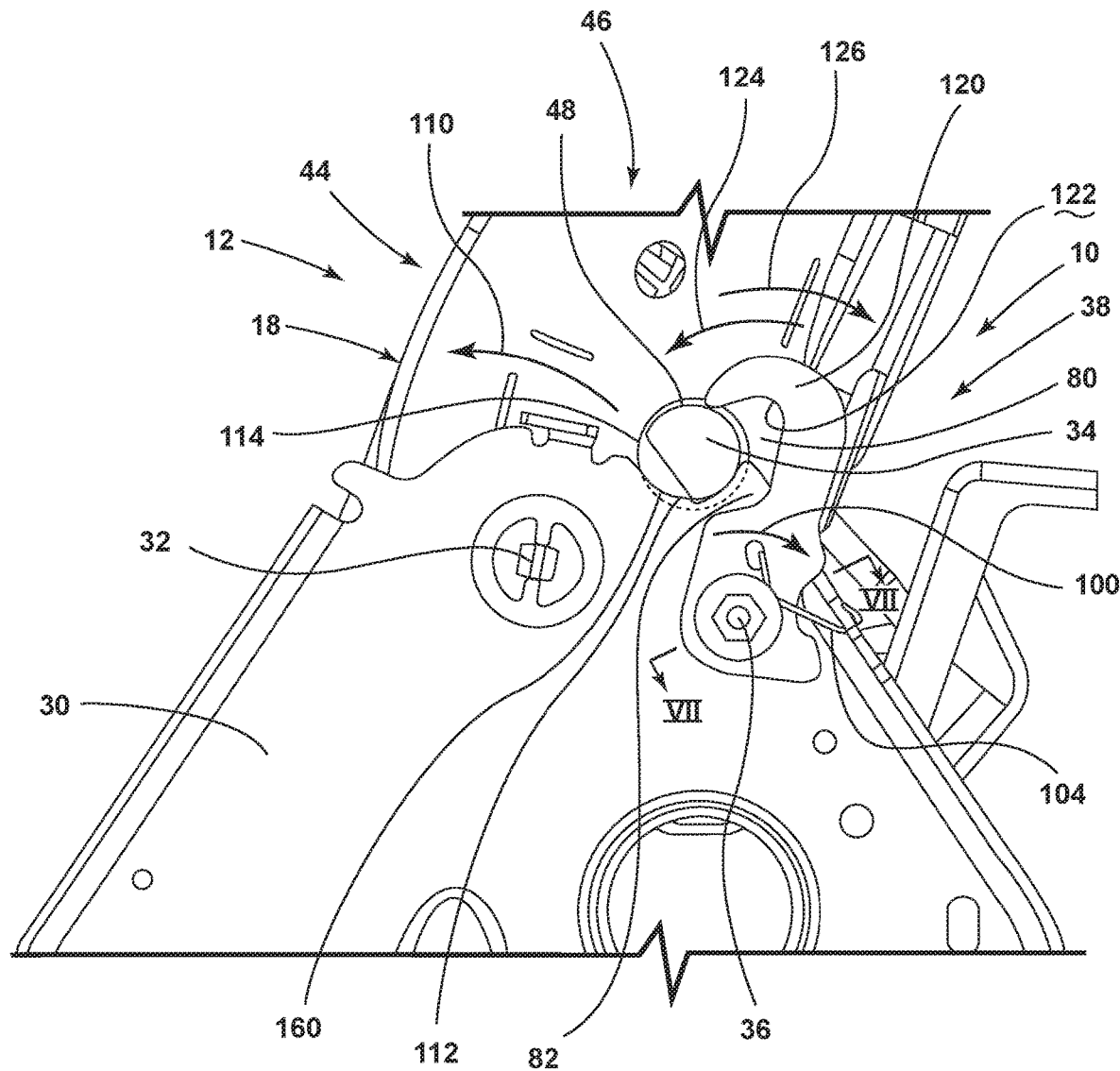
FIG. 5 is an enlarged elevational view of the seatback structure of FIG. 4 taken at area V.
Figure 6:
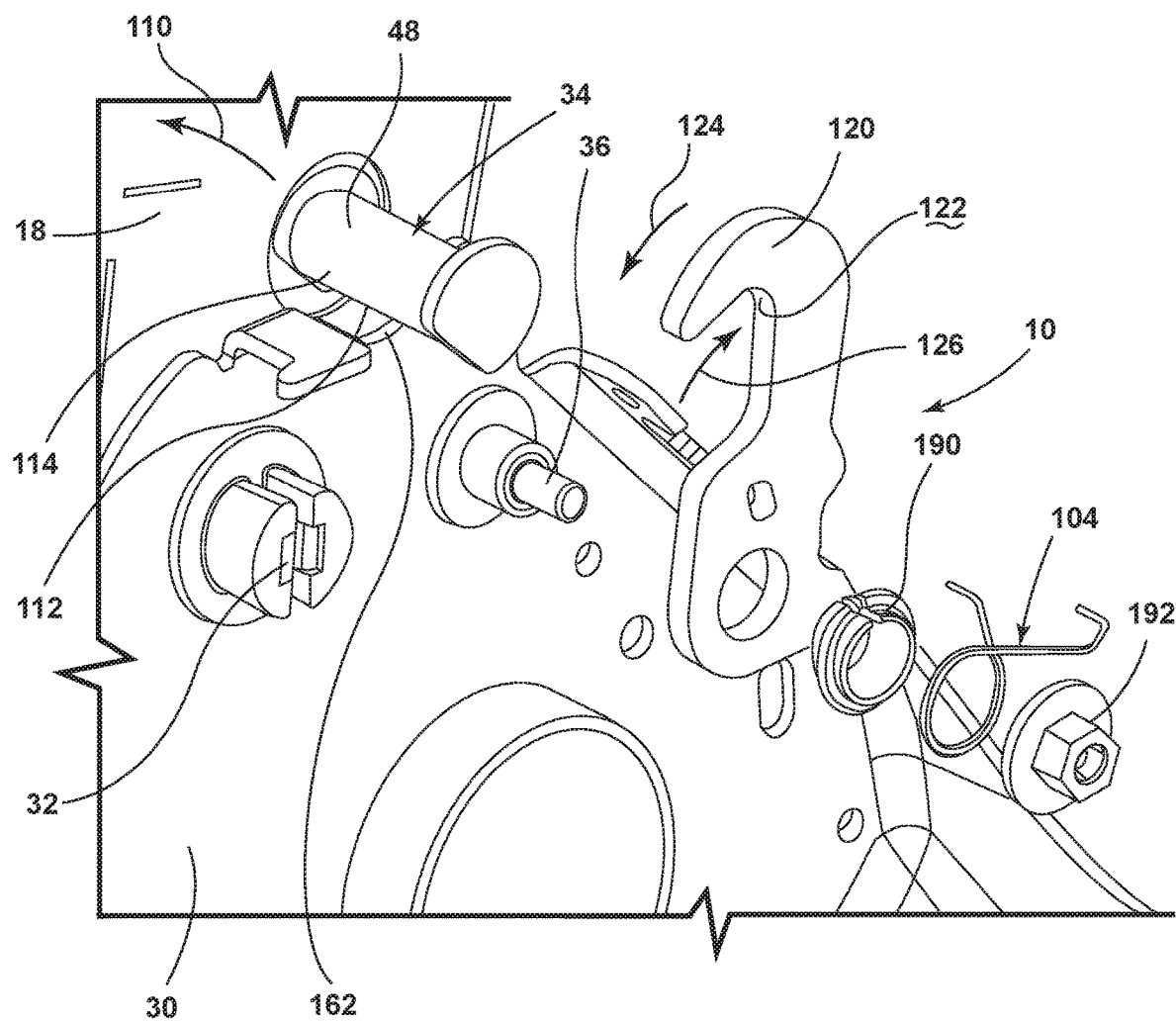
FIG. 6 is an exploded perspective view of the inertial latch of FIG. 5.
Figure 7:
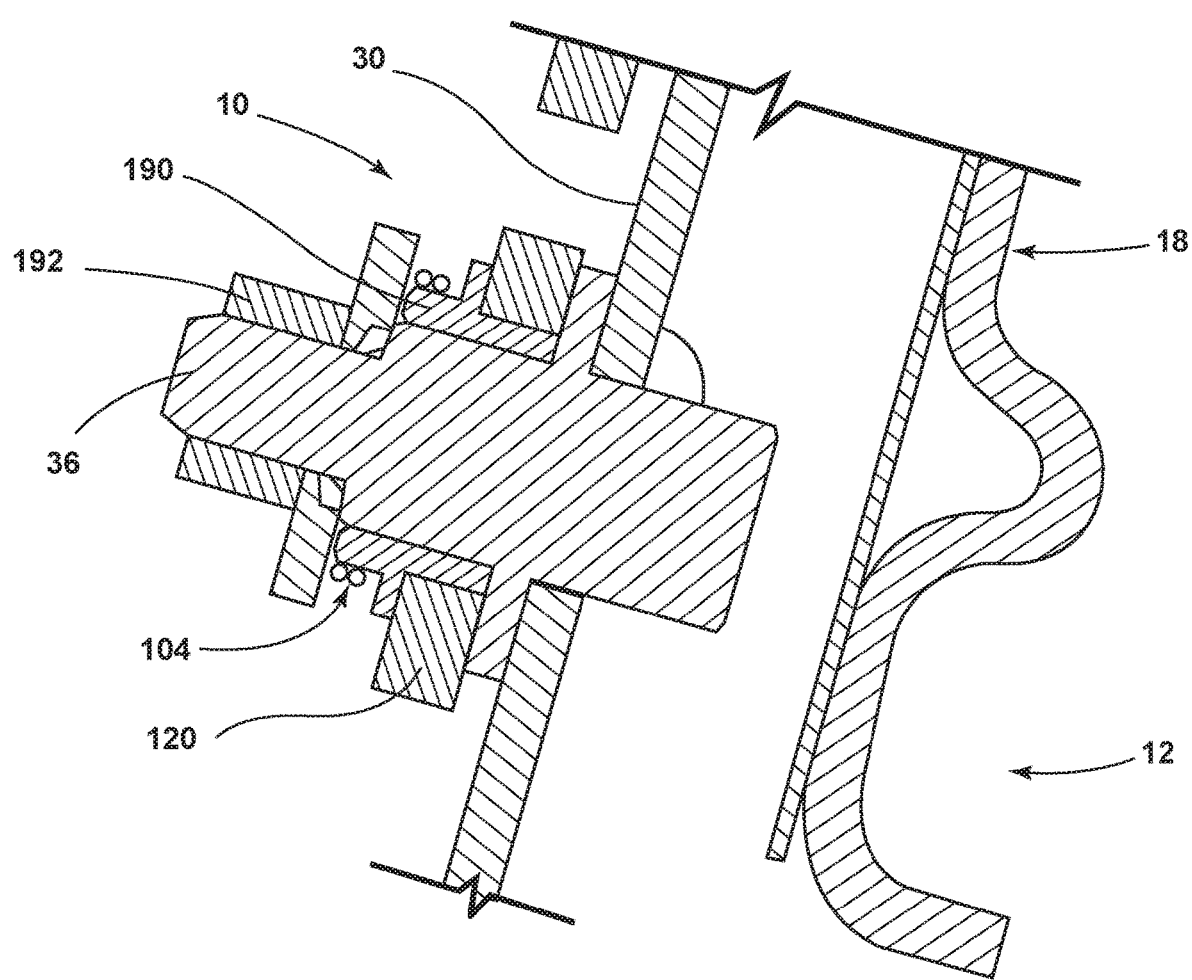
FIG. 7 is a cross-sectional view of the inertial latch assembly of FIG. 5 taken along line VII-VII.

As exemplified in FIGS. 5-7, the inertial latch 10 includes a bushing 190 that extends between the second pivot 36 and the hook portion 120. The bushing 190 provides a smooth interface and limits the amount of wobbling and vibration that may occur within the hook portion 120. The hook portion 120 is secured to the second pivot 36 by a fastener 192, such as a bolt, stud, rivet or other similar fastener 192. The biasing mechanism 104, typically in the form of the inertial spring, can be positioned around the bushing 190 and can extend between the base 30 and the hook portion 120. In this configuration, the biasing mechanism 104 can effectively and continually exert the return biasing force 100 on the inertial latch 10 toward the idle position 38.

As exemplified in FIGS. 3-6, the securing pin 34 is positioned rearward and slightly above the first pivot 32. As the seatback 18 is rotated from the upright position 46 and toward the storage position 62, the securing pin 34 initially rotates in a generally upward rotation 110 about the first pivot 32. Through this positioning of the securing pin 34, the inertial latch 10 is configured to engage a top portion 48 of the securing pin 34. By engaging a top portion 48 of the securing pin 34, the inertial latch 10 prevents this generally upward rotation 110 of the securing pin 34 about the first pivot 32 during the deceleration event 20. Additionally, through this configuration, the inertial latch 10 is free of engagement with a bottom portion 112 or a front portion 114 of the securing pin 34. This configuration of the inertial latch 10 with respect to the securing pin 34 minimizes the distance that the inertial latch 10 must travel in order to move into the deployed position 40. Simultaneously, the positioning of the inertial latch 10 relative to the securing pin 34 allows for free manipulation of the seatback 18 between the upright and storage positions 46, 62 when the inertial latch 10 is in the idle position 38.

Additionally, by engaging only a top portion 48 of the securing pin 34, the inertial latch 10 can be conveniently returned to the idle position 38 when the deceleration event 20 ends and the opposing directional force 42 is no longer present. In the absence of the opposing directional force 42, the inertial spring exerts the return biasing force 100 to rotate the inertial latch 10 back to the idle position 38. By returning to the idle position 38, the inertial latch 10 can be disengaged after the deceleration event 20 and can allow for movement of the seatback 18 to a forward position to access areas of the vehicle 14 behind the seatback 18, without the inertial latch 10 substantially impeding the movement of the seatback 18.

As exemplified in FIGS. 3-7, the inertial latch 10 includes a hook portion 120 having an engaging surface 122. This engaging surface 122 of the inertial latch 10 engages the top portion 48 of the securing pin 34 in the deployed position 40. As the inertial latch 10 moves toward the deployed position 40, the engaging surface 122 rotates in a generally downward direction 124 to engage the top portion 48 of the securing pin 34. Conversely, when the inertial latch 10 moves from the deployed position 40 back to the idle position 38, the inertial latch 10 rotates such that the engaging surface 122 rotates in an upward direction 126 away from the top portion 48 of the securing pin 34.

It should be understood that in the event of an extreme deceleration such as a severe impact, deflection of various components within the seat assembly 12 may cause the inertial latch 10 to be at least partially blocked from returning to the idle position 38.

Figure 8:
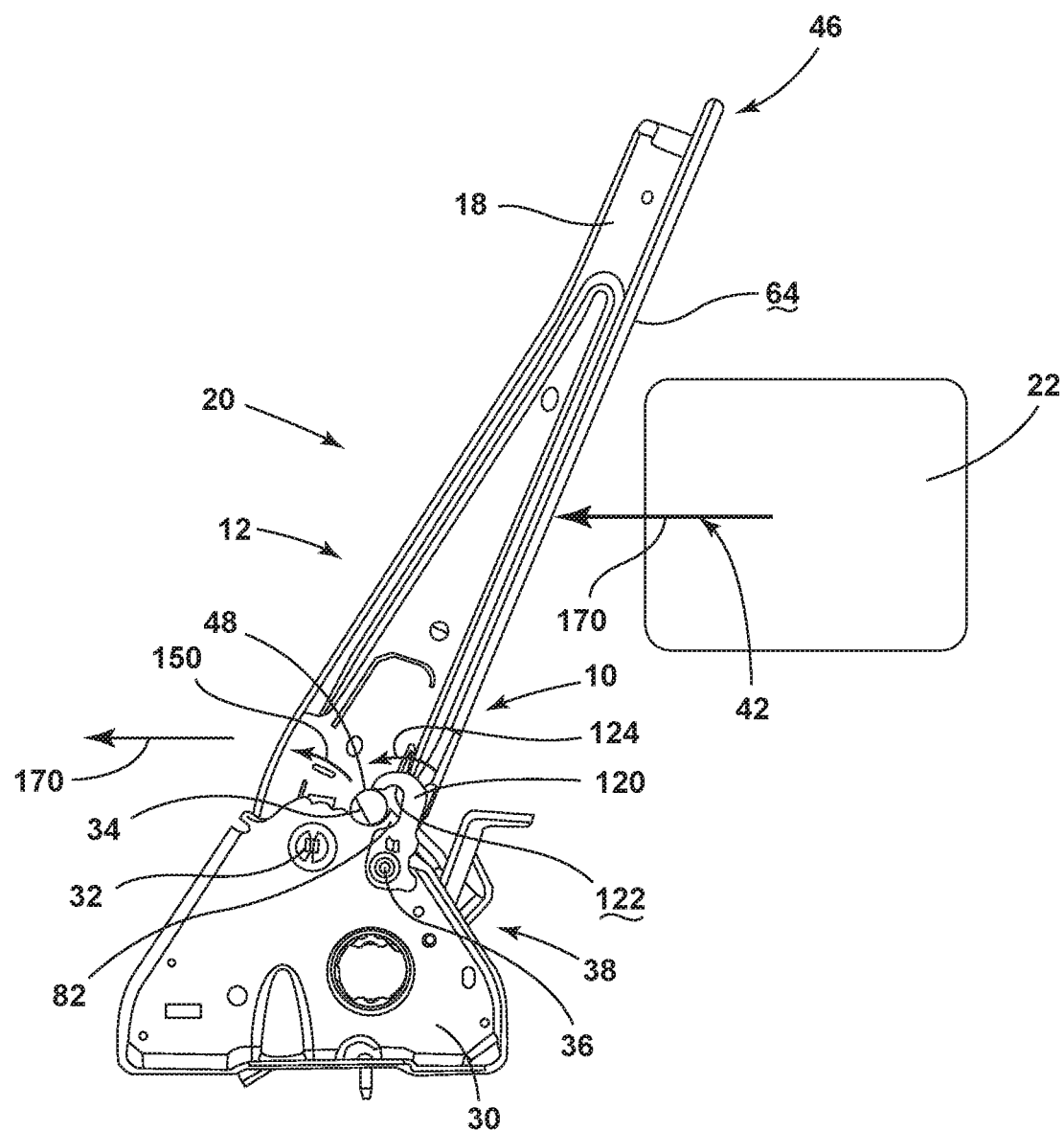
FIG. 8 is a schematic side elevational view of the seatback structure of FIG. 4 showing an object moving toward the seatback during a deceleration event.
Figure 9:
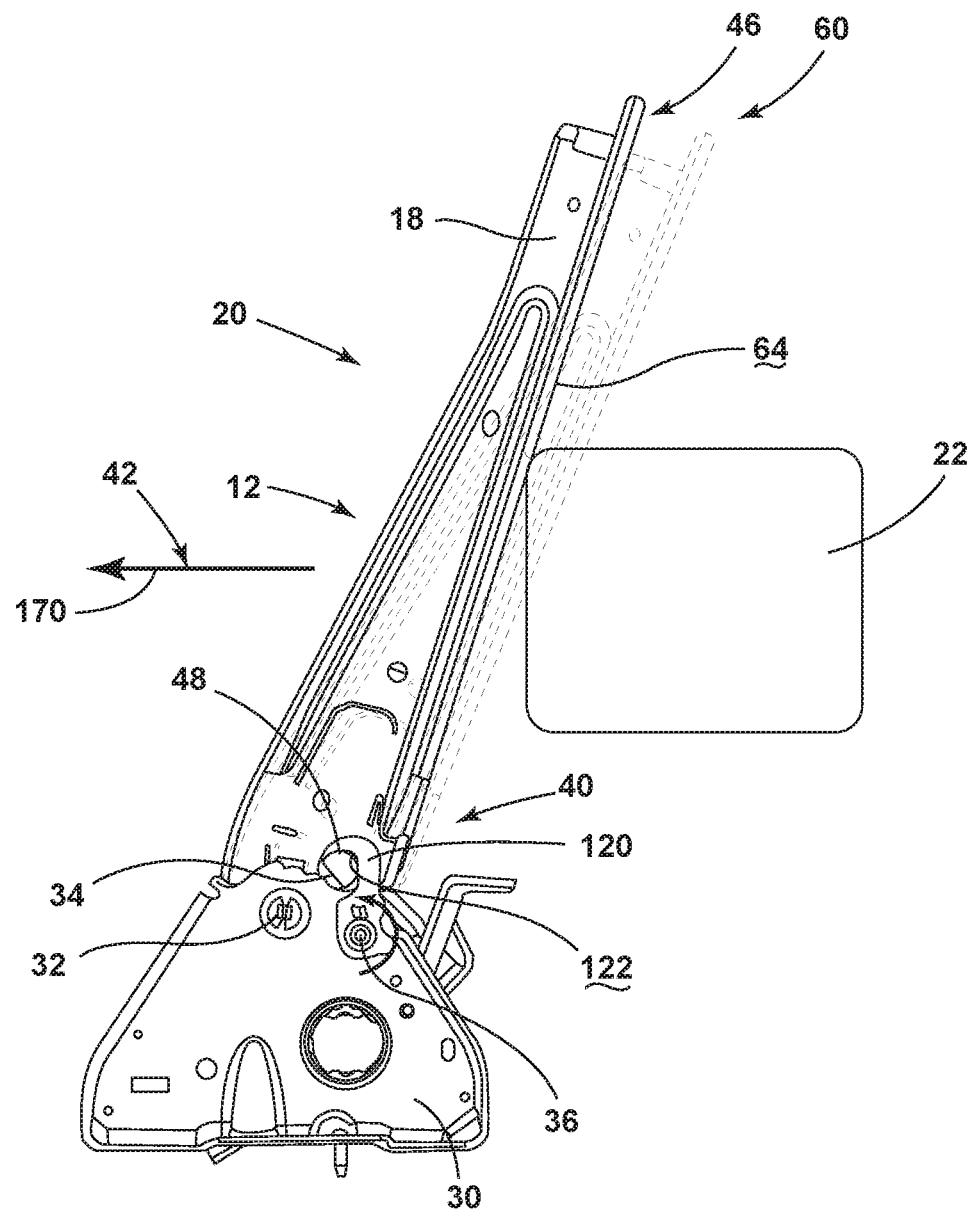
FIG. 9 is a schematic side elevational view of the seatback structure of FIG. 8 showing engagement of the inertial latch during the deceleration event.
Figure 10:
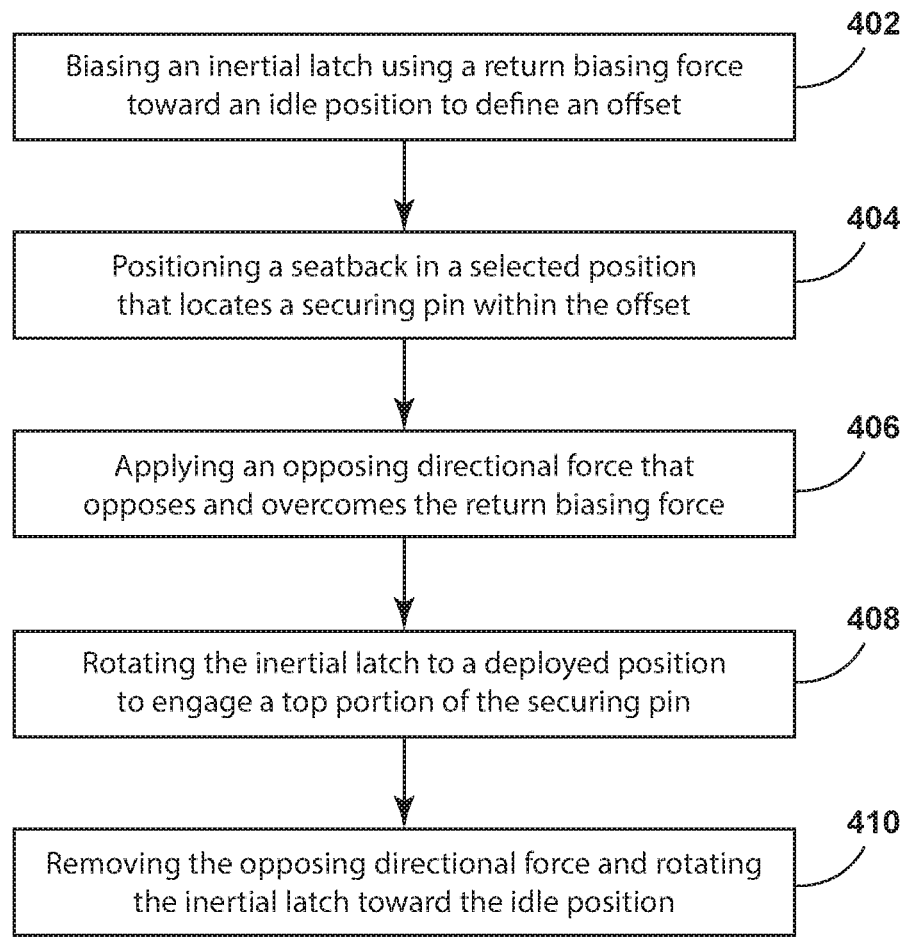
FIG. 10 is a schematic linear flow diagram illustrating a method for operating a vehicle seatback using an inertial latch.

As exemplified in FIGS. 8 and 9, during the deceleration event 20, the inertial latch 10 is moved by the opposing directional force 42 from the idle position 38 and into the deployed position 40. Typically, the inertial latch 10 will be used within rear seating positions 140 where cargo 22 may be stored behind the seatback 18 within various cargo areas of the vehicle 14. The seating position utilizing the inertial latch 10 may be a second row seat or a third row seat. It is also contemplated that the inertial latch 10 may be used within a front seating position 142 in various aspects of the device.

During the deceleration event 20, cargo 22 positioned behind the seatback 18 can be rapidly accelerated forward relative to the rapid deceleration of the vehicle 14 within which the cargo 22 is stowed. This cargo 22, in turn, may impact the rear surface 64 of the seatback 18. With the inertial latch 10 in the deployed position 40, the securing pin 34 is prevented from rotating about the first pivot 32. This engagement between the inertial latch 10 and the securing pin 34 also prevents rotation of the seatback 18 around the first pivot 32. Accordingly, where cargo 22 strikes or impacts against the rear surface 64 of the seatback 18, the inertial latch 10 prevents this cargo 22 from rotating the seatback 18 forward beyond the predetermined rotational position 44. In the case of a severe impact, the seatback 18 may rotate forward slightly where the impact of the cargo 22 with the seatback 18 may cause certain portions of the seat assembly 12 to deflect as the cargo 22 impacts the seatback 18.

Referring again to FIGS. 3-9, the inertial latch 10 can be in the form of a single piece hook that rotationally operates about the second pivot 36. As discussed above, the inertial latch 10 is biased towards the idle position 38 by the spring that operates about the second pivot 36. In this manner, each of the inertial latch 10 and the spring operate concentrically about the second pivot 36 to bias the inertial latch 10 towards the idle position 38. Because the second pivot 36 is offset 80 from the first pivot 32, the inertial latch 10 and the seatback 18 are each secured to the structure of the base 30. With the second pivot 36 being positioned rearward and distal from the first pivot 32, the inertial latch 10, when moved into the deployed position 40, is configured to absorb moment forces 150 that are exerted by the securing pin 34 as the seatback 18 is urged in a forward rotation 16 through the opposing directional force 42 of the deceleration event 20 as well as the inertia of various cargo 22 items that may impact the rear surface 64 of the seatback 18. The inertial latch 10, being positioned behind the securing pin 34, is configured to engage the top surface of the securing pin 34 and prevent this generally upward rotation 110 of the securing pin 34 about the first pivot 32 and away from the upright position 46. As discussed above, this engagement prevents the securing pin 34 from rotating about the first pivot 32 and also prevents the seatback 18 from rotating about the first pivot 32 and away from the predetermined rotational position 44 or the upright position 46 of the seatback 18.

Referring again to FIGS. 2-9, the seat assembly 12 for the vehicle 14 includes the base 30 that includes the first pivot 32 and the second pivot 36. The seatback 18 is rotationally operable about the first pivot 32 between a plurality of rotational positions 60. The securing pin 34 is attached to the seatback 18 and rotates with the seatback 18 through the plurality of rotational positions 60. The inertial latch 10 is operable about the second pivot 36 between the idle and deployed positions 38, 40. The inertial latch 10 in the idle position 38 defines an offset 80 within which the securing pin 34 can operate through the plurality of rotational positions 60. The deployed position 40 is defined by an opposing directional force 42 biasing the inertial latch 10 into selective engagement with a top portion 48 of the securing pin 34. This engagement between the inertial latch 10 and the top portion 48 of the securing pin 34 holds the seatback 18 in the selected position 90 or the predetermined rotational position 44 of the plurality of rotational positions 60. As discussed above, the predetermined rotational position 44 can be in the form of a single upright position 46 of the seatback 18 relative to the base 30. It is also contemplated that the predetermined rotational position 44 can also be any one of a plurality of use positions 70 that allow for incline and recline of the seatback 18 about the first pivot 32. As discussed above, the inertial latch 10 can be selectively operable to define the deployed position 40 through at least a range of these use positions 70 of the plurality of rotational positions 60.

As discussed above, in certain aspects of the device, the upright position 46 of the seatback 18 may be a fixed position. In such an embodiment, incline and recline of the seatback 18 between a plurality of use positions 70 may not be contemplated or provided for. The base 30 can include a bumper section 160 that receives the securing pin 34 when the seatback 18 is in the upright position 46. This bumper section 160 can provide feedback to the occupant of the seat assembly 12 that the seatback 18 is in the upright position 46. It is also contemplated that the bumper section 160 included within the base 30 may be indicative of a maximum reclined position 162 of the plurality of use positions 70.

Referring again to FIGS. 5-9, when the inertial latch 10 is in the idle position 38, an offset 80 is defined by a gap or space 82 between the inertial latch 10 and the securing pin 34. When the inertial latch 10 is in the idle position 38, the securing pin 34 is rotationally operable along with the seatback 18 about the first pivot 32. This rotation of the seatback 18 can be between the upright position 46 and the storage position 62. It is also contemplated that in various aspects of the device, the rotational operation of the seatback 18 may be between the plurality of use positions 70 of the seatback 18 that may incline and recline the seatback 18 relative to the base 30.

Referring now to FIGS. 1-10, having described various aspects of the inertial latch 10 of the seat assembly 12, a method 400 is disclosed for operating a vehicle seatback 18 that includes various aspects of the inertial latch 10. According to the method 400, the inertial latch 10 is biased toward the idle position 38 using a return biasing force 100 (step 402). As discussed above, in the idle position 38, the space 82 defined between the inertial latch 10 and the securing pin 34 includes an offset 80 that provides for movement of the securing pin 34 about the first pivot 32 relative to the inertial latch 10. In the idle position 38, the inertial latch 10 does not prevent rotation of the securing pin 34 about the first pivot 32. According to the method 400, the seatback 18 can then be positioned in a selected position 90 of the plurality of rotational positions 60 (step 404). This positioning of the seatback 18 serves to locate the securing pin 34 within the offset 80 defined between the inertial latch 10 and the securing pin 34. When the securing pin 34 is within this offset 80, the securing pin 34 is able to rotate about the first pivot 32 when the inertial latch 10 is in the idle position 38. At the same time, during a deceleration event 20, the securing pin 34 within the offset 80 is positioned to receive a hook portion 120 of the inertial latch 10 in the deployed position 40 to prevent rotation of the seatback 18 away from the upright position 46. According to the method 400, an opposing directional force 42 may be applied to the vehicle 14 (step 406). As discussed above, this opposing directional force 42 can be in the form of a sudden deceleration event 20. This sudden deceleration event 20 may be in the form of a frontal impact or an extreme braking of the vehicle 14. These deceleration events 20 may tend to cause cargo 22 within a rear portion of the vehicle 14 to move, through the inertia toward the rear surface 64 of the seatback 18. The inertia of the various cargo 22 within the rear of a vehicle 14 may cause the cargo 22 to move toward and impact the seatback 18. This impact between the cargo 22 and the seatback 18 tends to cause the seatback 18 to experience a moment force 150 in the forward direction 170 and about the first pivot 32.

Referring again to FIGS. 1-10, according to the method 400, during the sudden deceleration event 20 where the opposing directional force 42 is exerted, the inertial latch 10 is rotated to the deployed position 40 through the force of the opposing directional force 42. This movement of the inertial latch 10 to the deployed position 40 serves to engage the inertial latch 10 with a top portion 48 of the securing pin 34 (step 408). With the inertial latch 10 in engagement with the top portion 48 of the securing pin 34, the securing pin 34 is prevented from rotating in a generally upward rotation 110 about the first pivot 32 and relative to the inertial latch 10. As discussed previously, the securing pin 34 is positioned such that when the seatback 18 is rotated forward, the securing pin 34 undergoes an initial upward and forward rotation 16 about the first pivot 32. Because the inertial latch 10 engages the top portion 48 of the securing pin 34 in the deployed position 40, the inertial latch 10 prevents this upward rotation 110 about the first pivot 32. This engagement, in turn, prevents the seatback 18 from rotating about the first pivot 32. Accordingly, the various moment forces 150 that are experienced by the seatback 18 through the deceleration event 20 and through an impact of cargo 22 with the rear surface 64 of the seatback 18 are absorbed by the inertial latch 10 and the base 30 of the seat assembly 12.

According to various aspects of the device, the method 400 can also include a step 410 where the opposing directional force 42 is removed. When the opposing directional force 42 is removed, the inertial spring that continually exerts the return biasing force 100 tends to cause the inertial latch 10 to move back to the idle position 38 and away from the securing pin 34. When the opposing directional force 42 is removed and the inertial latch 10 is moved back to the idle position 38, the seatback 18 can then be moved between the plurality of rotational positions 60.

As exemplified in FIGS. 1-10, through the use of the inertial latch 10, the seatback 18 can be retained within the upright position 46 during a deceleration event 20, and during an impact between a cargo item and the rear surface 64 of the seatback 18. Using the inertial latch 10, the seatback 18 is prevented from rotating forward and potentially into an occupant of the seat assembly 12 having the inertial latch 10. According to various aspects of the device, the inertial latch 10 can be positioned on each side of the base 30 for the seat assembly 12. In this manner, a pair of inertial latches 10 are positioned at each side of the seat assembly 12 to absorb moment forces 150 that are exerted by the seatback 18 during a deceleration event 20 and during a potential impact with cargo 22 engaging the rear surface 64 of the seatback 18. It is also contemplated that the inertial latch 10 can be a supplemental mechanism that cooperates with a disk recliner lock that guides the rotational operation of the seatback 18 about the first pivot 32. In various aspects of the device, the inertial latch 10 can replace the disk recliner lock such that the inertial latch 10 is the primary locking mechanism for maintaining the seatback 18 in the upright position 46. The elimination of the disk recliner lock, in favor of the inertial lock 10, can result in a savings of time and resources in the vehicle manufacturing process.

Because the inertial latch 10 is secured to the base 30 of the seat assembly 12, the absorption of moment forces 150 by the inertial latch 10 can transfer these forces through the base 30 and, in turn, into the frame 180 of the vehicle 14 during the deceleration event 20. Accordingly, when the inertial latch 10 moves into the deployed position 40, the selected engagement between the inertial latch 10 and the securing pin 34 of the seatback 18 forms a generally secure assembly between the seatback 18, the securing pin 34, the inertial latch 10, the base 30 and the vehicle frame 180. Conversely, when the inertial latch 10 is in the idle position 38, the seatback 18 is able to move substantially freely relative to the base 30 and about the first pivot 32. Accordingly, the inertial latch 10 provides a selective securing engagement between the base 30 and the seatback 18 during the deceleration event 20.

As discussed above, the inertial latch 10 can be used within various vehicles 14 that can include, but are not limited to, sedans, coupes, SUVs, vans, pickup trucks, cargo vehicles, mass transit vehicles, and other similar vehicle types. It is also contemplated that the inertial latch 10 can be used within various seating positions within a vehicle 14. These seating positions can include, but are not limited to, second row seating positions, third row seating positions, other rear seating positions 140, front seating positions 142, and other various seating positions within a wide range of vehicles 14.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat assembly comprising:
a seatback rotationally coupled to a base at a first pivot;
a securing pin coupled with the seatback; and
an inertial latch operable about a second pivot to define an idle position defined by the inertial latch biased distal from the securing pin, and a deployed position defined by an opposing directional force biasing the inertial latch into selective engagement with the securing pin wherein the seatback is maintained in a predetermined rotational position wherein the inertial latch in the deployed position engages a top portion of the securing pin and prevents forward rotation of the seatback.

2. The vehicle seat assembly of claim 1, wherein the inertial latch in the idle position defines an offset between the inertial latch and the securing pin, wherein the securing pin is rotationally operable with the seatback and within the offset between a plurality of rotational positions.

3. The vehicle seat assembly of claim 2, wherein the inertial latch is selectively operable to define the deployed position through at least a range of use positions of the plurality of rotational positions.

4. The vehicle seat assembly of claim 1, wherein the inertial latch is a single piece hook that rotationally operates about the second pivot.

5. The vehicle seat assembly of claim 1, wherein the inertial latch is biased toward the idle position by a biasing mechanism that operates about the second pivot.

6. The vehicle seat assembly of claim 1, wherein the securing pin is rearward of the first pivot, and wherein rotational operation of the seatback from an upright position to a storage position defines an initial upward rotation of the securing pin relative to the inertial latch.

7. The vehicle seat assembly of claim 6, wherein the inertial latch in the deployed position is free of engagement with a front portion and a bottom portion of the securing pin.

8. A vehicle seat comprising:
a base having a first pivot and a second pivot;
a seatback rotationally operable about the first pivot between a plurality of rotational positions;
a securing pin attached to the seatback; and
an inertial latch operable about the second pivot between idle and deployed positions, wherein the inertial latch in the idle position defines an offset within which the securing pin can operate through the plurality of rotational positions, and wherein the deployed position is defined by an opposing directional force biasing the inertial latch into selective engagement with a top portion of the securing pin and holding the seatback in a selected position of the plurality of rotational positions, wherein the base defines a bumper section that prevents rotational operation of the vehicle seat rearward of the plurality of rotational positions.

9. The vehicle seat of claim 8, wherein the offset is defined by a gap between the inertial latch and the securing pin in the idle position, wherein the securing pin is rotationally operable with the seatback and within the offset between the plurality of rotational positions.

10. The vehicle seat of claim 9, wherein the inertial latch is selectively operable to define the deployed position through at least a range of positions of the plurality of rotational positions.

11. The vehicle seat of claim 8, wherein the inertial latch is a single piece hook that rotationally operates about the second pivot.

12. The vehicle seat of claim 8, wherein the inertial latch is biased toward the idle position by a biasing spring that operates about the second pivot.

13. The vehicle seat of claim 8, wherein the securing pin is rearward of the first pivot, and wherein rotational operation of the seatback from an upright position to a folded position defines an initial upward movement of the securing pin relative to the inertial latch.

14. The vehicle seat of claim 13, wherein the inertial latch in the deployed position is free of engagement with a front portion and a bottom portion of the securing pin.

15. The vehicle seat of claim 8, wherein upon removal of the opposing directional force the inertial latch is biased back toward the idle position.

16. A method for operating a seatback for a seat assembly of a vehicle comprising steps of:
biasing an inertial latch using a return biasing force toward an idle position to define an offset;
positioning the seatback in a selected position of a plurality of rotational positions that locates a securing pin within the offset;
applying an opposing directional force that opposes and overcomes the return biasing force;
rotating the inertial latch to a deployed position to engage a top portion of the securing pin to prevent generally upward rotation of the securing pin relative to the inertial latch; and preventing forward rotation of the seatback away from the selected position when the inertial latch is in the deployed position.

17. The method of claim 16, further comprising a step of:
removing the opposing directional force, wherein the inertial latch is biased by the return biasing force toward the idle position such that the seatback is selectively operable between the plurality of rotational positions.

* * * * *